United States Patent [19]
Haytayan

[11] Patent Number: 5,927,035
[45] Date of Patent: Jul. 27, 1999

[54] PANEL FASTENING SYSTEM

[76] Inventor: Harry M. Haytayan, 32 Indian Rock Rd., Nashua, N.H. 03063

[21] Appl. No.: 08/829,838

[22] Filed: Apr. 1, 1997

[51] Int. Cl.$^6$ ....................................................... E04B 2/30
[52] U.S. Cl. ............................ 52/483.1; 52/671; 52/672; 52/783.11; 52/783.14; 411/108; 411/372
[58] Field of Search ............................ 52/483.1, 783.11, 52/703.14, 783.15, 783.16, 783.19, 797.1, 792.1, 798.1, 671, 672, 787.1; 411/372, 108, 102

[56] References Cited

U.S. PATENT DOCUMENTS

| | | | |
|---|---|---|---|
| 3,252,493 | 5/1966 | Smith | 151/41.7 |
| 3,785,421 | 1/1974 | Launay | 151/41.75 |
| 3,952,398 | 4/1976 | Haytayan | 29/432 |
| 4,040,554 | 8/1977 | Haytayan | 227/8 |
| 4,122,904 | 10/1978 | Haytayan | 173/15 |
| 4,452,387 | 6/1984 | Haytayan | 227/8 |
| 4,655,380 | 4/1987 | Haytayan | 227/9 |
| 5,006,025 | 4/1991 | Duran | 411/183 |
| 5,028,189 | 7/1991 | Harley | 411/108 |
| 5,094,579 | 3/1992 | Johnson | 411/107 |
| 5,096,349 | 3/1992 | Landy et al. | 411/108 |
| 5,676,511 | 10/1997 | Meylan | 411/372 |

*Primary Examiner*—Christopher Kent
*Assistant Examiner*—Yvonne Horton-Richardson
*Attorney, Agent, or Firm*—Pandiscio & Pandiscio

[57] ABSTRACT

The present invention relates to a system for fastening a first structure to a second structure comprising a fastener having a head disposed at a proximal end of a shaft and a pointed tip disposed at a distal end of that shaft, and a plastic sleeve surrounding a portion of the shaft in coaxial-relation thereto. In a preferred embodiment, the first structure is a metal floor panel having means for receiving the fastener and the sleeve. The receiving means keeps the sleeve in substantially perpendicular-relation to a support portion of the second structure, with the pointed tip of the shaft disposed adjacent to the support portion. In this arrangement, when a driving force is applied to the head of the fastener, the fastener moves axially relative to the sleeve through the first structure into engagement with the second structure.

24 Claims, 1 Drawing Sheet

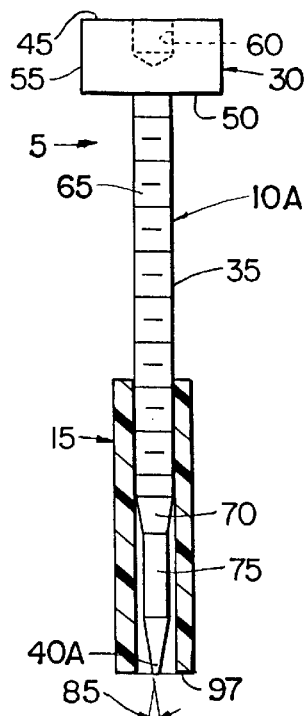
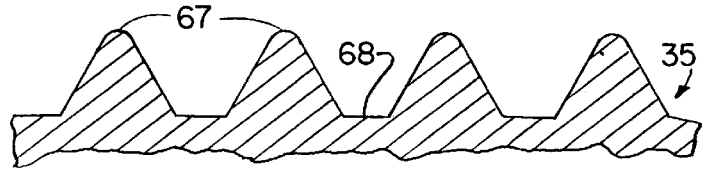
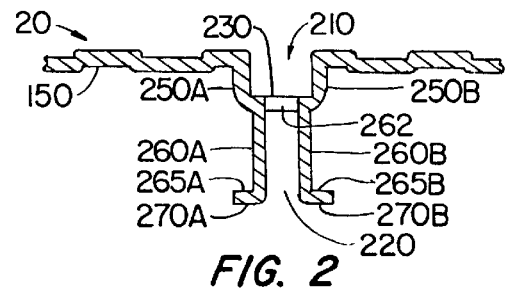
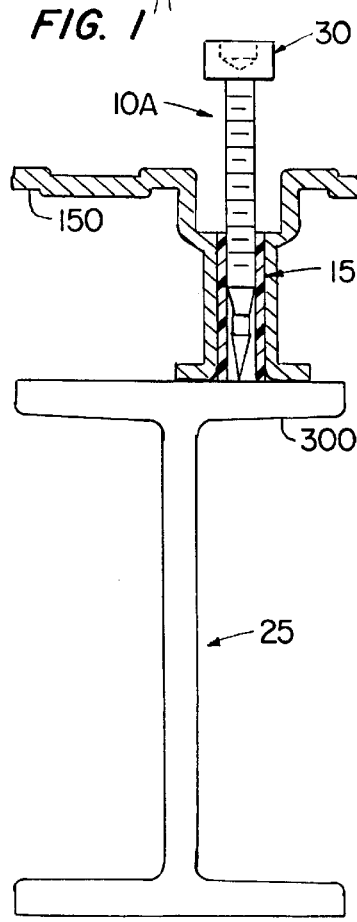
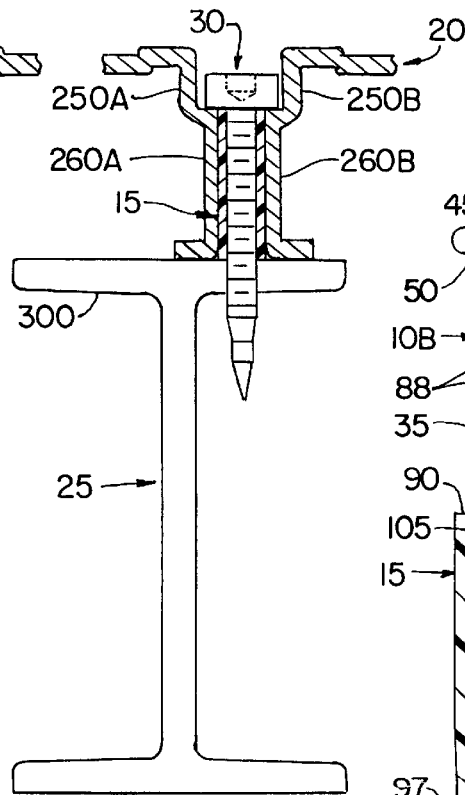
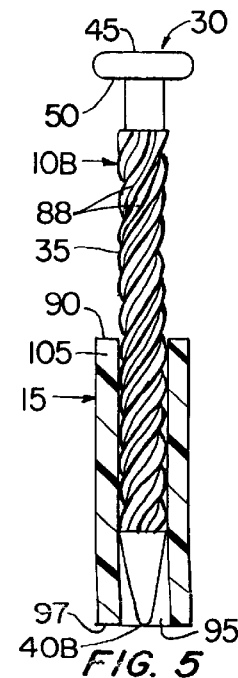

ns of 5,927,035

PANEL FASTENING SYSTEM

FIELD OF THE INVENTION

The present invention generally relates to fastening structural elements together, and more particularly to a system and method for fastening structural elements together by fastener s that are guided so as to remain in a preferred orientation during engagement with the structural elements.

BACKGROUND OF THE INVENTION

It is well known to use screws, nails, or similar pin-type fasteners for attaching various metal and wood structures to one another. For example, nail-type pins having spiral grooves disposed along a portion of their length may be used to fasten aluminum floor, wall, or ceiling panels to supporting structures in motor vehicles and/or architectural structures. In some instances (such as a motor vehicle chassis) it is necessary to drive the pin-type fastener into and through metal I-beams or the like.

In the case of truck flooring, aluminum floor panels may be used that include a recessed portion along one side through which the pin-type fasteners are driven into an underlying I-beam in the chassis of the truck. Unfortunately, often not enough fastener guidance is provided to assure proper engagement of the pin-type fastener with the underlying I-beam. Very often the pin-type fastener either skews "off-center" without penetrating the I-beam or the pin-type fastener enters the I-beam at a non-optimum angle. In either case, the pin-type fastener will exhibit inadequate gripping of the I-beam, resulting in a poorly fastened floor panel.

As a consequence, there has been a long felt need for an improved system for using pin-type fasteners to fasten a first structure to an underlying support structure that prevents skewing of the fasteners as they are driven into engagement with the underlying support structure.

OBJECTS AND SUMMARY OF THE INVENTION

A primary object of the present invention is to provide a novel system for fastening a first structure to a second structure.

A further another object of the present invention is to provide a novel fastener assembly for securing together two structural components that comprises either a screw-type or nail-type fastener and is adapted to maintain its fastener in a preferred orientation while it is being driven into and through the structural components.

Still another object of the present invention is to provide a self-guided fastener assembly for securing together two structural components that comprises a screw-type fastener that can be removed by an unscrewing action.

A further object of the present invention is to provide a novel fastening system for the truck vehicle manufacturing industry that is compatible with existing aluminum panel constructions currently in use in that industry.

These and other objects of the present invention are achieved through the provision of a novel system for fastening a first structure to a second structure that includes a fastener assembly comprising a fastener having a head disposed at a proximal end of a shaft and a pointed tip disposed at a distal end of the same shaft, and a relatively flexible sleeve surrounding said shaft. The first structure includes fastener assembly receiving means that comprises a hole and a channel for receiving the fastener assembly. The sleeve of the fastener assembly and the receiving channel cooperate to align the fastener in substantially perpendicular-relation to the second structure. Consequently, when a driving force is applied to the head of the fastener, the sleeve acts as an alignment guide for the fastener as the latter is driven through the first structure into the second structure.

BRIEF DESCRIPTION OF THE DRAWINGS

These and other objects, features and advantages of the present invention will be more fully disclosed in, or rendered obvious by, the following detailed description of preferred and alternative embodiments of the invention, which are to be considered together with the accompanying drawings wherein like numbers refer to like parts and further wherein:

FIG. 1 is an elevational view, partially in section, of a fastener assembly formed in accordance with the present invention;

FIG. 2 is a broken-away, sectional view of a portion of a first structure showing fastener assembly receiving means formed in accordance with the present invention;

FIG. 3 is an elevational view, partially in section, of a fastener assembly positioned within fastener assembly receiving means prior to being driven into engagement with a second structural member;

FIG. 4 is an elevational view, partially in section, and similar to FIG. 3, but showing the fastener assembly of the present invention fully engaging and fastening a first structural member to a second structural member;

FIG. 5 is an elevational view, partially in section, of an alternative embodiment of the fastener assembly of the present invention; and FIG. 6 is a broken-away, sectional view of a portion of the fastener shown in FIGS. 1, 3 and 4, as taken along lines 6—6 in FIG. 1.

DETAILED DESCRIPTION OF THE PREFERRED EMBODIMENTS

Referring first to FIGS. 1, 2 and 5, the present invention generally comprises provision of a plurality of fastener assemblies 5 each comprising a fastener 10 and a supporting sleeve 15, for use with fastener assembly receiving means of a first structural panel member 20. The present invention is designed to facilitate the fastening of first structural panel member 20 to a second structural member 25 (FIG. 3) that forms a portion of a motor vehicle chassis, an architectural structure, or the like (not shown). The fastener 10 may comprise either a screw-type fastener 10A (FIGS. 1, 3 and 4) or a nail-type fastener 10B (FIG. 5), both of which preferably are formed from a metal or metal alloy of the type that is well known in the art. In either case, the fastener 10 (A or B) includes a head 30, a shaft 35 and a conical tip 40.

In the case of screw-type fasteners 10A, head 30 comprises a cylindrical disk having a flat top surface 45, a bottom surface 50 and a cylindrical side surface 55. It will be understood that head 30 of the screw-type fastener may have some other shape, e.g., top surface 45 may be concave or convex, and side surface 55 may be tapered. In the case of nail-type fastener 10B, the head 30 also may have a shape that differs from what is shown in the drawings. In both types of fastener, the bottom surface 50 is preferably substantially flat and disposed at a right angle to shaft 35 and side surface 55, as shown in FIGS. 1 and 5. A recess 60 of selected design is formed in top surface 45 of screw-type fastener 10A for accepting a screw-type extracting means, e.g., a Philips-type screwdriver.

Still referring to FIGS. 1 and 3, the straight shank or shaft 35 of screw-type fastener 10A comprises a relatively straight, elongate threaded portion 65, a transition portion 70, a pilot shaft portion 75 and a conical point or tip 40(A). Threaded shaft portion 65 includes a screw thread (short pitch) that is adapted to screw into and releasably engage a portion of structural member 25. Referring to FIG. 6, threads 67 preferably comprise a pitch angle of about 60° and a flat root 68 disposed between the flank surfaces 66 of threads 67. Transition portion 70 has a frusto-conical shape so as to provide for the transition in diameter from threaded shaft portion 65 to pilot shaft portion 75. Pilot shaft portion 75 is typically cylindrically-shaped and comprises a diameter that is smaller than the diameter of threaded portion 65. Conical point 40 comprises an apex angle (indicated at 85) in the range from about 20° to about 60° so as to be adapted to pierce metal or the like, as will hereinafter be disclosed in further detail.

It will be appreciated that if removal of fastener 10 from the two structural members which it connects is not required, the fastener may take the form of a nail-type fastener 10B, as shown in FIG. 5. Nail-type fastener 10B also comprises a head 30, a straight shank or shaft 35 and a tip 40(B). Unlike screw-type fastener 10A, however, nail-type fastener 10B does not have a recess 60 in the top surface 45 of its head 30 or a pilot shaft portion 75 or a transition portion as shown in FIG. 1. Tip 40B comprises an apex angle in the range from about 20° to about 60° so as to also be adapted to pierce metal. Nail-type fastener 10B preferably, but not necessarily, comprises plural helix threads 88 (long pitch) that are adapted to fixedly engage a metal structure. It will be appreciated that the plural helix threads 88 may, but need not, comprise a flat root (like root 68 in FIG. 6) disposed between the flank surfaces of the helical threads. Of course, nail-type fastener 10B may have only a single helix thread; alternatively it may comprise other surface features, e.g., a plurality of axially-spaced ribs (not shown) to provide an anchoring connection to structural member 25.

It should be noted that if the structural member 25 is made of relatively thin gauge (1/16"–1/8" thick) steel or aluminum, the nail-type fastener 10B shown in FIG. 5 may be modified to have a step-down shank and a recessed head similar to the shank and head of fastener 10A, and in such case the modified fastener will penetrate and adequately hold to the member 25 and also may be removed therefrom by an unscrewing action.

Referring to FIGS. 1 and 5, sleeve 15 is formed separately from fasteners 10A and 10B, and preferably comprises a cylindrical tube formed from a plastic or polymeric material, such as polyethylene, polypropylene, nylon, or the like. These plastic materials are used since they are resilient but can be made with selected stiffness. Also, sleeve 15 could be formed of aluminum or steel, but a plastic sleeve is preferred for cost and other reasons.

Preferably sleeves 15 are made so that they are relatively stiff, but yet retain resiliency. In a preferred embodiment, sleeve 15 comprises an open proximal end 90, an open distal end 95, and a cylindrical axial passageway defined by a cylindrical side-wall 105. Open distal end 95 is preferably formed with a flat annular end surface 97 which is in substantially perpendicular relation to the longitudinal axis of sleeve 15. The inner diameter of sleeve 15 is somewhat smaller than the diameter of the threaded portions of shaft 35, preferably about 0.002" less, so as to assure an adequate gripping action of sleeve 15 relative to fasteners 10A and 10B. Of course, it is understood that sleeve 15 may have various lengths and diameters as determined by the dimensions of fastener 10 (A or B) and the fastener assembly receiving means of the structural member 20. Preferably, sleeve 15 has a length substantially equal to or slightly less than the depth of channel 220 (hereinafter defined), although it can be greater than that depth if it is made of plastic. Also, the outer diameter of each sleeve 15 is only slightly less than the width of each channel 220 measured between flanges 260A and 260B, so that the flanges will act to maintain the sleeve and fastener in a substantially perpendicular position relative to structural members 20 and 25. By way of example, sleeve 15 has an outer diameter about 0.002" less than the distance between flanges 260A and 260B.

In the preferred embodiment of the present invention, a fastener 10A and a sleeve 15 are first joined together to form fastener assembly 5. Preferably, but not necessarily, fastener assembly 5 is assembled so that its conical point or tip 40a is close to or flush with the annular end surface 97 of sleeve 15, as shown in FIGS. 1, 3 and 5. Owing to the differential between the outer diameter of the shank of the fastener and the inner diameter of sleeve 15, the side-wall 105 of sleeve 15 is stressed radially outward by the fasteners and hence tends to grip the fastener.

In the preferred embodiment of this invention, structural member 20 is a floor, wall or ceiling panel designed for the cargo compartment of a trailer truck body, and structural member 25 is a portion of the superstructure or frame of the truck body. In such a case, structural member 20 and second structural member 25 are often made of steel or aluminum or an aluminum alloy or other natural or man-made material. Structural panel member 20 may be formed in various ways, e.g., by extruding aluminum. By way of example only, in the illustrated embodiment of the invention the structural member 25 is an I-beam. However, it is to be understood that structural member 25 can take some other form, e.g., an angle iron or a U-shaped channel member. Although not shown, it is to be understood that in practice a plurality of like structural members 25 are combined to form the superstructure or frame of a truck body or other unit, with the members 25 being secured together in a selected grid or frame arrangement, with each member 25 extending in intersecting and/or parallel spaced relation with other like members. Also, although not shown, it is to be understood that a plurality of like panel members 20 are secured to the grid or frame composed of like members 25.

In the illustrated embodiment of the present invention, each structural panel member 20 is corrugated as shown at 150. It is to be understood that only a portion of structural member 20 is shown in the drawings and that in fact each panel member 20 is several feet in width and length. Structural panel member 20 has a plurality of fastener assembly receiving means in the form of a plurality of first channels 210 on its upper side, plus a plurality of second channels 220 on its bottom side and a web portion 230 separating channel 210 from channel 220. Although only one channel 210 and only one channel 220 are shown, it is to be understood that each structural panel member 20 comprises a plurality of channels 21 and 220 as shown, with each channel 210 and 220 being parallel to and spaced from other like channels. The channels 210 and 220 extend for the full length of panel member 20.

Each first channel 210 comprises side walls 250A and 250B and web section 230. Channel 210 is wide enough to accept the head 30 of fastener 10A (or 10B), as shown in FIG. 4. Each bottom channel 220 is aligned with and opens away from channel 210. Each channel 220 comprises a pair of parallel depending flanges 260A and 260B and common-web portion 230. The bottom ends of flanges 260A, 260b are bent at right angles away from one another so as to form two foot sections 270A, 270B. The two foot sections are engaged with structural member 25 (FIGS. 3 and 4), as hereinafter disclosed in further detail. Each channel 220 is narrower than each channel 210.

Each structural panel 20 also comprises a plurality of holes 262 that are formed in web portions 230 either during fabrication of that member or at the time it is attached to structural member 25. Holes 262 are spaced lengthwise along web 230, one next to the other, throughout the length of channels 210 and 220. Each hole 262 is made with a diameter that is only slightly greater than the outer diameter of sleeve 15 after the sleeve 15 has been fitted with a fastener 10, but smaller than the diameter of fastener head 30 (FIGS. 3 and 4). Preferably, holes 262 have a diameter about 0.002" greater than the outer diameter of sleeves 15.

Fastener assemblies 5 are used to fasten one or more structural members 20 to a plurality of second structural members 25 in the manner described below using fasteners 10A.

Each panel member 20 is placed upon a structural member 25 with foot sections 270A and 270B resting on flange 300 of member 25 (FIG. 3). Next, fastener assembly 5 is inserted into one of the holes 262 in panel member 20. Preferably, but not necessarily, sleeve 15 of the fastener assembly has a length such that when it is engaged with member 20, its top end is about flush with the upper surface of web 230, as shown in FIG. 3. Sleeve 15 makes a relatively close-fit within hole 262 and second channel 220 (FIGS. 3 and 4). As a consequence, fastener 10A will be disposed in substantially perpendicular-relation to flange 300 of the I-beam 25, thereby reducing or eliminating any tendency for it to be skewed "off-center" while being driven into the I-beam flange.

Once fastener assembly 5 is positioned within channel 220, e.g., as shown in FIG. 3, fastener 10A may be driven through flange 300 of the I-beam 25, as shown in FIG. 4. This is easily accomplished using a pneumatic or powder-actuated driver of the type shown in my U.S. Pat. Nos. 3,952,398, 4,040,554, 4,122,904, 4,452,387 and 4,655,380. The foot of the driver tool (not shown) is sized so as to fit into channel 210. When the driver is fired, its hammer is propelled against fastener head 30, driving fastener 10A into and through the I-beam flange 300. Sleeve 15 acts as a guide for the fastener 10 as the latter is driven into flange 300, restraining it from skewing "off-center" as it is initially engaged by the driver's hammer. As flange 300 is pierced, pilot shaft portion 75 coacts with the I-beam flange to further maintain fastener 12 in perpendicular relation with the I-beam. Preferably the driver used to drive fastener 10 into the I-beam has a hammer operating stroke that is long enough to force the fastener head 30 tight against web 230, thereby assuring that feet 270A, 270B are forced into tight engagement with the I-beam. As shown in FIG. 4, the sleeve 15 remains in channel 220 after the fastener is driven into flange 30. If sleeve 15 initially protrudes slightly above web 230 when it is located in channel 220, the driving action of the fastener will compress the sleeve axially and the plastic nature of the sleeve will allow it to deform under the compression force.

The foregoing process is repeated at each of the holes 262 in each channel 210, so as to fully fasten structural panel member 20 to a plurality of structural members 25. It will be appreciated that if screw-type fasteners 10A are used, the structural member 20 may be unfastened from second structural member 25 by simply unscrewing the screw-type fasteners.

Of course, the same type of driver may be used to drive nail-type fasteners 10B into second structural member 25. Here, again, sleeve 15 acts as a guide for the fastener during the entire driving process, thereby reducing the likelihood of the fastener being driven at a skewed angle.

ADVANTAGES OF THE INVENTION

Numerous advantages are obtained by employing the present invention. More specifically, a fastening system is provided which avoids problems associated with prior art fastening systems. In addition, an improved self-guided fastener assembly is provided for use in fastening a first metal structure to a second metal structure. Also, the invention provides a fastening system that utilizes a fastener that is removable by an unscrewing action.

Furthermore the invention is compatible with existing aluminum panel constructions currently in use to manufacture truck trailer bodies and large heavy duty portable shipping containers of the kind used in railroad and maritime shipping.

It is to be understood that the present invention is by no means limited to the particular constructions herein disclosed and shown in the drawings, but also comprises any modifications or equivalents within the scope of the claims. Thus, for example, the sleeves 15 may make a loose fit on the fasteners, in which case the sleeves may be inserted in holes 230 before or after they are united with the fasteners. Still other possible modifications are known to persons skilled in the art.

What is claimed is:

1. A panel fastening system comprising:

a first structure;

a second structure;

a fastener having a shaft with a head disposed at a proximal end of said shaft and a pointed tip disposed at a distal end of said shaft; and a separately formed sleeve disposed on and closely surrounding said shaft;

said first structure including a panel section and a fastener-receiving section for receiving said fastener and said sleeve, said fastener-receiving section comprising coaxally aligned first and second channels, and a hole providing communication between said first and second channels, said hole having a diameter that is less than the maximum diameter of said fastener head but large enough to accommodate said sleeve, said first channel being sized to accept said head of said fastener and said sleeve, said second channel being sized to receive said sleeve in a close non-binding fit, whereby (1) said sleeve and fastener shaft adopted to be inserted into said second channel via said first channel and said hole, and (2) said second channel will maintain said inserted sleeve and thereby said fastener in substantially perpendicular-relation to said panel section and also to a portion of said second structure, with said pointed tip of said fastener shaft disposed adjacent to said second structure, so that when a driving force is applied to said head of said fastener said sleeve will serve to axially guide said fastener shaft as said pointed tip passes through said first structure into engagement with said second structure.

2. Apparatus according to claim 1 wherein said receiving section comprises a channel sized to receive said sleeve in a close fit.

3. Apparatus according to claim 2 wherein said first structure comprises a second channel that is aligned with said first channel and is sized so as to accept said head of said fastener and said sleeve.

4. Apparatus according to claim 3 wherein said first and second channels are back-to-back and further including a hole providing communication between said first and second channels.

5. Apparatus according to claim 4 wherein said sleeve is disposed in said first channel and said fastener shaft extends out of said sleeve and through said hole into said second channel, said hole having a diameter less than said head, whereby to prevent said head from passing through said hole.

6. Apparatus according to claim 4 wherein said fastener comprises a screw.

7. Apparatus according to claim 6 wherein said fastener head has a recess adapted to be operatively engaged by a tool for screwing said screw out of engagement with said second structure.

8. Apparatus according to claim 6 wherein said shaft has a screw thread that is characterized by a short pitch and a flat root.

9. Apparatus according to claim 4 wherein said fastener comprises a nail.

10. Apparatus according to claim 9 wherein said nail comprises a shaft with a long pitch helical thread.

11. Apparatus according to claim 1 wherein said sleeve is formed with an internal diameter that is smaller than the diameter of said shaft, whereby said sleeve is in gripping relation to said shaft.

12. Apparatus according to claim 4 wherein said sleeve has a length that is substantially equal to the depth of said first channel.

13. Apparatus according to claim 1 wherein said sleeve comprises a polymer.

14. Apparatus according to claim 13 wherein said sleeve comprises a polymer selected from the group consisting of polyethylene, polypropylene, and nylon.

15. Apparatus according to claim 1 wherein said first structure comprises a corrugated aluminum floor panel for a truck body.

16. Apparatus according to claim 1 wherein said second structure comprises a structural portion of said truck body.

17. Apparatus according to claim 16 wherein said second structure comprises an I-beam or an angle iron or a channel member.

18. A panel fastening system comprising:

an aluminum panel;

a metal support member underlying said aluminum panel;

a nail or screw for use in fastening said aluminum panel to said underlying metal support member, said nail or screw having a shaft with a head disposed at a proximal end of said shaft and a pointed tip disposed at a distal end of said shaft; and a sleeve surrounding and gripping a portion of said distal end of said shaft;

said aluminum panel having first and second opposite sides with a first channel open on said first side, and a second channel open on said second side, said channels being formed so as to share a common web, said first channel being sized so as to accept said head of said nail or screw and said second channel being sized so as to slidably accept said sleeve, said common web defining at least one hole therethrough, said at least one hole having a diameter larger than the outer diameter of said sleeve but smaller than the outer diameter of said head, said second channel being sized so as to maintain said sleeve in substantially perpendicular-relation to said underlying support member with said pointed tip of said shaft disposed adjacent to said underlying support member, so that when (1) said sleeve is inserted into said second channel via said hole so that said head of said nail or screw is disposed on said first side of said panel, and (2) a driving force is applied to said head of said nail or screw, said sleeve will axially guide a portion of said shaft as said fastener is driven into engagement with said underlying support member.

19. A panel fastening system for securing a metal panel to a metal support, said system comprising:

a metal panel that is characterized by a plurality of first channels open on one side of said panel, a plurality of second channels open on an opposite side of said panel, said second channels being aligned with said first channels, and a plurality of holes leading from said first channels to said second channels;

a metal support engaged with said panel on the side of said second channels; and at least one fastener assembly comprising a fastener having a shank, a head at one end of said shank, and a pointed tip at the opposite end of said shank, and a sleeve surrounding said shank, said sleeve being positioned so that it extends through one of said holes into one of said second channels with said pointed tip of said fastener confronting said metal support, whereby when said fastener is driven into said metal support by impacting said head, said sleeve will serve as a guide to assure that said fastener is aligned perpendicular to said metal support as it is driven into said metal support.

20. A pane fastening system according to claim 19 wherein the length of said sleeve is substantially equal to the depth of said second channels.

21. A panel fastening system according to claim 19 wherein the head of each fastener is larger than said holes but is small enough to fit in said first channels.

22. A panel fastening system according to claim 19 wherein said second channels are formed by ribs that project from said metal panel.

23. A panel fastening system according to claim 22 wherein each rib is formed with a foot section for engaging said mental support.

24. A panel fastening system according to claim 19 wherein said sleeve is made of a plastic material or aluminum or steel.

* * * * *

UNITED STATES PATENT AND TRADEMARK OFFICE
CERTIFICATE OF CORRECTION

PATENT NO. : 5,927,035
DATED : July 27, 1999
INVENTOR(S) : Harry M. Haytayan

It is certified that error appears in the above-identified patent and that said Letters Patent is hereby corrected as shown below:

Title page,
Change the filing date from "Apr. 1, 1997" to -- March 31, 1997 --.

Column 8, claim 23,
Line 53, change the word "mental" to -- metal --.

Signed and Sealed this

Twenty-third Day of October, 2001

Attest:

NICHOLAS P. GODICI
Attesting Officer
Acting Director of the United States Patent and Trademark Office